Sept. 21, 1965 J. E. OLSON 3,207,348
VACUUM TYPE LOAD HANDLING APPARATUS
Filed Dec. 21, 1962 3 Sheets-Sheet 1
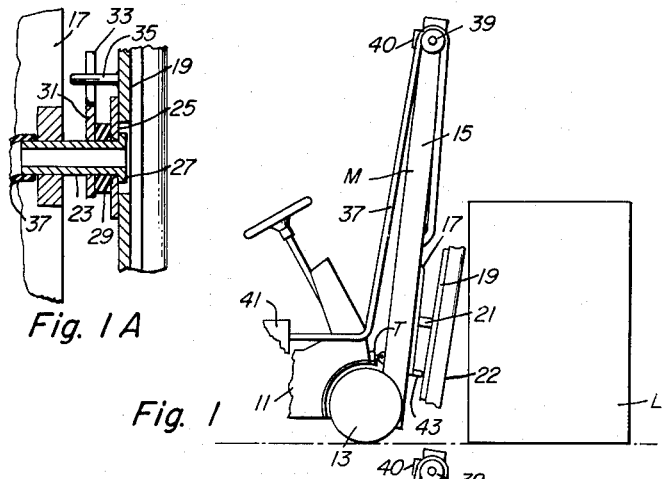
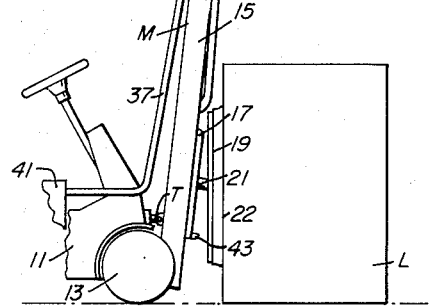
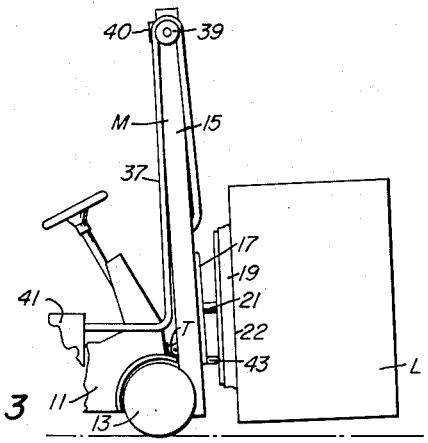
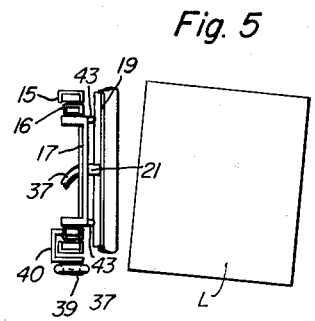
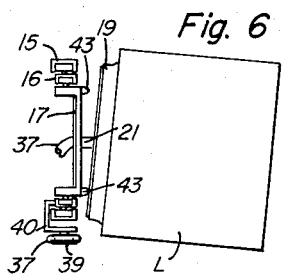
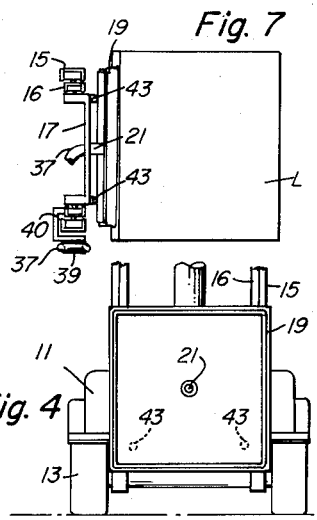
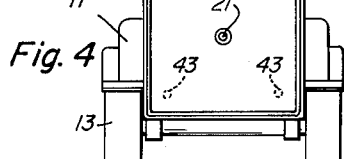
JOHN E. OLSON
INVENTOR.
BY
BUCKHORN, BLORE, KLARQUIST & SPARKMAN
ATTORNEYS Sept. 21, 1965   J. E. OLSON   3,207,348
VACUUM TYPE LOAD HANDLING APPARATUS
Filed Dec. 21, 1962   3 Sheets-Sheet 2

JOHN E. OLSON
INVENTOR.
BY
BUCKHORN, BLORE, KLARQUIST & SPARKMAN
ATTORNEYS

Sept. 21, 1965  J. E. OLSON  3,207,348
VACUUM TYPE LOAD HANDLING APPARATUS
Filed Dec. 21, 1962  3 Sheets-Sheet 3

JOHN E. OLSON
INVENTOR.
BY
BUCKHORN, BLORE, KLARQUIST & SPARKMAN
ATTORNEYS

United States Patent Office 3,207,348
Patented Sept. 21, 1965

3,207,348
VACUUM TYPE LOAD HANDLING
APPARATUS
John E. Olson, Portland, Oreg., assignor to Hyster Company, Portland, Oreg., a corporation of Nevada
Filed Dec. 21, 1962, Ser. No. 246,629
5 Claims. (Cl. 214—650)

This invention relates to a carriage structure of a lift truck and more particularly to a carriage structure having vacuum type load engaging means. This application is copending with and is a continuation-in-part of my prior application entitled "Suction Apparatus and Method for Picking Up Articles, Especially Paper Rolls," Serial No. 64,639, filed October 24, 1960, now Patent No. 3,147,872.

The usual forms of load engaging devices on industrial lift trucks permit load engagement and pick up even though there is only approximate alignment of the device and the load. With a vacuum head, the alignment must be much more accurate, or else the sealing means of the head will not be in full contact, making it impossible or difficult to draw a proper vacuum at the head.

While it is possible to so maneuver the truck as to attain the above described alignment, this is time consuming, makes for expensive load handling operations, and requires the services of a skilled operator.

It is a main object of the present invention to overcome the above problem by providing a vacuum type load engaging means that its mounted so as to permit it to adjust its position, within limits, to that of the load so that more rapid load handling than heretofore attained is possible.

A further object is to provide a structure like that just described wherein the load engaging means is stabilized after the load is picked up to prevent the load engaging means and the load from excessive free movement during travel of the truck from one place to the other.

Various other objects of the invention will be apparent from the following description taken in connection with the accompanying drawings wherein:

FIGS. 1, 2 and 3 are side elevational views of a lift truck having a carriage structure of the present invention, and showing, in successive stages of a load pick up operation, how the vacum head tilts about a transverse axis to adjust its position to that of the load;

FIG. 1A is an enlarged fragmentary vertical sectional view of the indicated portion of FIG. 1;

FIG. 4 is a fragmentary front elevational view of the truck in FIG. 3;

FIGS. 5, 6 and 7 are plan views of the carriage structure and the mast showing how the vacuum head tilts about a vertical axis to adjust itself to the position of the load;

Figure 9:
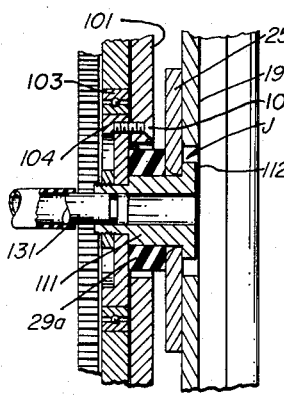
FIG. 9 is an enlarged view of the central portion of the structure in FIG. 8.

Referring to FIGS. 1–4, the industrial lift truck shown has a body 11 supported in part by front wheels 13. A mast M is pivotally mounted at its lower end at the front of the body 11 (or on the front wheel axles) for tilting movement from a forward inclined position to a rearwardly inclined position under the influence of tilting means T. The mast has outer uprights 15 and inner uprights 16 (see FIG. 5).

Movable along the mast by means of a suitable lift means (not shown) is a carriage structure of the present invention. The carriage structure includes a base unit 17 (best shown in FIG. 5), and suction head means in the form of a vacuum head 19 which is mounted by a universal connection 21 (FIG. 1) on the base 17. The head has an endless peripheral sealing member 22 for engaging and forming a seal with a load L.

Connection 21 is best shown in FIG. 1A and comprises a hollow shaft 23 rigidly supported by the base 17 and projecting through a hole in a plate 25 secured to the rear of the base portion of the head 19. The shaft 23 is equipped on its outboard end with a retaining collar or flange 27 to retain the plate 25 and thus the head 19 on the shaft.

The edges of the plate 25 which define the hole in plate 25 are relieved at the rear portions thereof to enable the plate to have universal tilting movement relative to the shaft 23.

A vacuum seal 29 in the form of an elastomer washer surrounds the shaft just rearwardly of the plate 25 and prevents or restricts air from leaking into the head 19 past the opposed portions of the plate 25 and the shaft 23. The washer, being compressible, does not preclude universal tilting movement of the plate 25 (and thus the head 19) relative to the shaft 23.

Rearwardly of the washer 29 is a retainer plate 31 which is secured to the shaft 23. The retainer plate has a bifurcated upper end portion 33 which loosely receives a pin 35 which is secured to the rear of the head 19. The pin 35 prevents rotation of the head 19 relative to the shaft 23 but does not interfere with the universal tilting movement of the head on the shaft 23.

A flexible conduit 37 (FIGS. 1 and 1A) extends from the hollow shaft 23 (which also functions as a conduit) upwardly and over a slack take up sheave 39 mounted by a bracket 40 on the inner uprights 16 (compare FIGS. 1 and 5). The flexible conduit then extends to a source of vacuum 41 shown diagrammatically on the body 11 of the truck.

There are means for stabilizing the vacuum head 19 and its load after a load is picked up. In the form of the invention shown in FIGS. 1–7, the means comprises a pair of lugs 43 secured to the base unit 17 at a level below that of the universal joint 21 (see FIG. 4) and disposed in spaced relation one on either side of a vertical line through the joint 21.

The manner of functioning of the lugs 43 is best explained in connection with the explanation of the operation of the head 19.

Operation

It is apparent from FIG. 1A that the tiltable axis of the head 19 is disposed slightly rearwardly of the center of gravity of the head. Thus, a moment force is created causing the head to swing in a clockwise direction, as the parts are shown in FIG. 1, until it engages the lugs 43.

When the mast M is tilted forwardly, the head 19 will assume an even more forwardly inclined position as shown in FIG. 1. In such position, the head is free to tilt, within limits, in universal fashion about the connection 21 to adjust its position to that of the load L. The load L is shown in the form of a rectangular box or package. It is assumed that the exterior surface of the load is sufficiently smooth so that an effective seal with the head 19 may be formed. It is pointed out, however, that an effective seal can be formed even though the surfaces of the box have considerable irregularities, such as for instance wrinkles.

In FIG. 1 the head 19 is shown adjacent the load L with the truck advancing toward the load. FIG. 2 shows that the truck has moved forwardly sufficiently to bring the head 19 against the load and shows that the head has tilted about a transverse axis to adjust its position to that of the load L. In such position, the head 19 is spaced from the lugs 43.

A vacuum is now drawn to enable the head to pick up the load. FIG. 3 shows that the mast M has been tilted rearwardly to pick up the load L and that the weight of the load has tilted the head 19 in a clockwise direction relative to the base 17 to bring the head against the lugs 43. In this condition, the force of gravity holds the head and its load against the lugs 43 to stabilize the head and load to enable the truck to be driven from one place to the other without objectionable swinging movement of the head and load relative to the mast M. The stabilized three-point support of the head is best realized by considering FIGS. 3 and 4.

While the head 19 is shown mounted so that under the force of gravity it tends to swing in a clockwise direction, as the parts are shown in FIG. 1, the head could be mounted so that it tended to remain upright or even tilt counterclockwise. However, the way shown in the drawings is preferable.

It is pointed out that it is not necessary to tilt the mast M rearwardly in order to bring the unitized head and load against the lugs 43, because the moment force created by the load will do this, as the carriage is raised, even though the mast M is forwardly inclined.

While the lugs 43 are shown mounted on the carriage base unit 17, they could be mounted on the head 19, or in fact one could be on the base unit and one on the head.

An important feature of the invention is that at the time of engaging a load, the head be free of the influence of the lugs 43 to enable the head to tilt toward or away from the lugs so that the head can adjust its position to that of the load. Of course, if tilting movement of the head only away from the lugs were required, engagement of the lugs and head at load-pick-up time would not be detrimental.

FIGS. 5–7 show how the head 19 can tilt about a vertical axis to adjust its position to that of the load L, and FIG. 7 shows how the load is subsequently moved so that its position is adjusted to the stabilized position of the head 19.

*Second form of invention*

FIGS. 8 through 15 show a modified form of the invention in which the vacuum head 19a is rotatable under power relative to the carriage base unit 17a. The head is stabilized at transport time by a three-point support system like that provided in the first form of the invention, as will be clearly evident from the following description.

Figure 8:
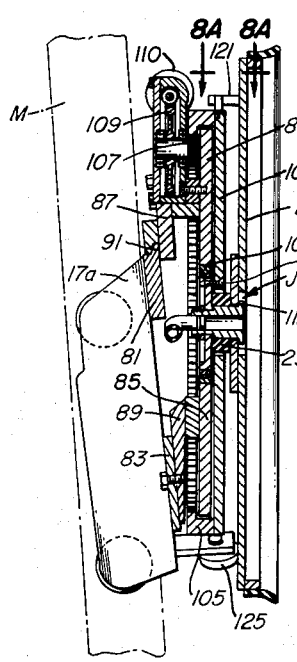
FIG. 8 is a vertical midsectional view through a modified form of the invention.

The base unit 17a has two mounting plates 81 and 83 (FIG. 8). Mounted on these plates is an apron base structure which includes a circular mounting or base plate 85. A hanger assembly 87 is secured to plate 85 adjacent the upper end of the latter, and an abutment structure 89 is secured, as by welding to the plate 85 adjacent the lower end of the latter. The hanger assembly 87 provides a downwardly facing groove receiving a rib 91 provided by the mounting plate 81. The bottom abutment structure 89 rests against and is bolted to the bottom mounting plate 83 thereby retaining plate 85 in a fixed position during movement of the apron.

A revolving apron 101 is rotatably mounted on the mounting plate 85 by means of a bearing 103 (FIGS. 8 and 9) which is mounted in a central opening in the plate 85. The inner race of the bearing 103 is mounted on a small back plate 104 secured to the rear of apron 101 by fastener 102.

The apron 101 has a flange 105 (FIG. 8) enclosing the peripheral edge of the plate 85. The flange is provided with internal teeth engaged by the pinion 107 of a speed reduction unit 109. The unit is driven by a fluid motor 110. The unit and motor are mounted on the hanger assembly 87.

The vacuum head 19a is mounted for universal tilting movement by a universal joint J. The joint J includes a tubular shaft 111 (FIGS. 8 and 9) which projects through and is secured to the back plate 104. The head 19a has a back plate 25a tiltably mounted on the shaft 111 and retained in place by a collar 112 on the shaft 111. A seal 29a fits on the shaft 111 between the back plates 104 and 25a to prevent any substantial leakage between plates 25a and 104.

Figure 8A:
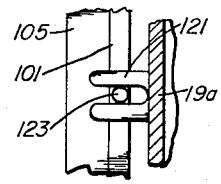
FIG. 8A is an enlarged fragmentary horizontal sectional view taken along lines 8A—8A of FIG. 8.
Figure 11:
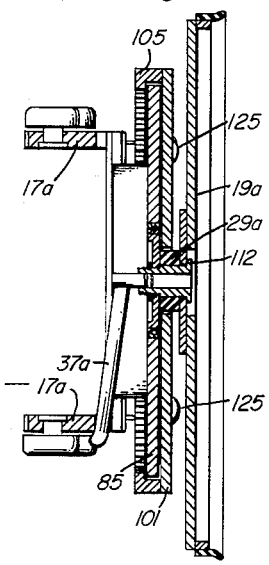
FIG. 11 is a horizontal section taken along lines 11—11 of FIG. 10.

A clevis 121 (FIGS. 8 and 8A) is fixed to the rear of the head 19a and projects rearwardly therefrom and loosely straddles a driving pin 123 which is fixed to the apron 101.

Figure 12:
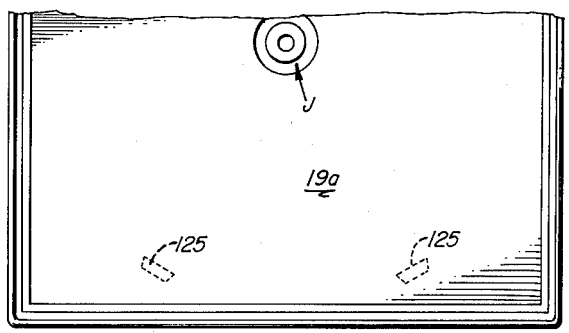
FIG. 12 is a fragmentary front elevational view of the structure of FIG. 8.

Located at a level below that of the shaft 111 is a pair of stabilizing members in the form of rollers 125 (FIGS. 10 and 12) which are mounted for rotation on a pair of arms 127. The arms are secured to the base 17a. The axes of rotation of the rollers are radial lines passing through the axis of rotation of the head 19a (FIG. 12). The rollers are equally spaced on opposite sides of a vertical line through the axis of the universal joint J, as is apparent from FIG. 12.

Figure 10:
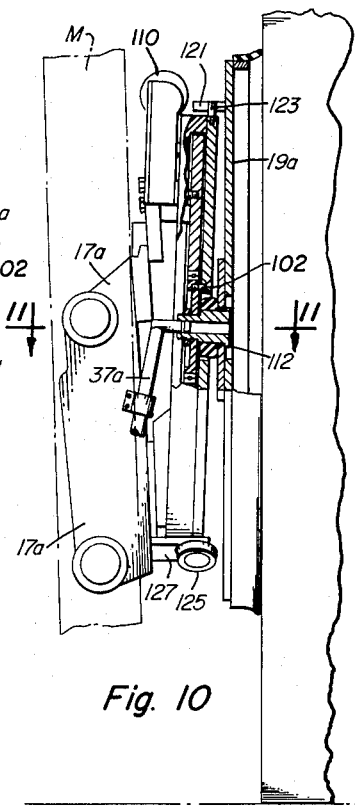
FIG. 10 is a side elevational view of the structure of FIG. 8, with parts broken away.

The shaft 111 also serves as a suction conduit and it rotatably receives a conduit section 131 (FIG. 9) which in turn is connected to a flexible conduit 37a (FIG. 10). The latter extends to the body of the associated truck (not shown in FIGS. 8–15) in a manner similar to that of conduit 37.

*Operation*

The head 19a tends to pivot in a clockwise direction to remain in contact with the rollers 125 because the tiltable axis of the head is slightly rearwardly of the center of gravity of the head. When the mast M tilts from its FIG. 8 to its FIG. 10 position, the apron 101, which was upright in FIG. 8, assumes a forwardly inclined position in FIG. 10. This enables the head to freely tilt to adjust its position to that of the opposed vertical face of the load L. Thereafter, when suction is provided and the load is lifted, the load will cause the head to tilt clockwise to move into engagement with the stabilizing rollers 125, because the tilting axis of the head and load is at the universal joint J, whereas the center of gravity of the load is forwardly of the joint.

When the head is against the rollers 125, it is stabilized by the force of gravity (the weight of the load) against sidewise tilting movement about a vertical axis or counterclockwise tilting movement about a transverse axis, or any combination of such movements. The clevis 121 and pin 123 prevent rotary movement of the head 19a relative to the apron 101.

When the mast M is tilted rearwardly, the stabilizing force is increased because the rollers 125 assume a relatively more forward position with respect to the universal joint J. The further forward the rollers are disposed, the greater the force applied to the rollers because the vertical force component increases from a zero value, when the rollers are directly beneath the joint, to a value equal to that on the joint, if the rollers were to be disposed in the same horizontal plane as the joint (which latter positioning is, however, impossible with the particular mounting and mast arrangement provided).

Now, if it is desired to rotate the head 19a, to orient the load differently, the fluid motor 111 may be energized, by the supply of fluid to it from a truck mounted pump, through hoses or conduits, not shown. The motor 111 will rotate the apron 101 which, through the pin 123, will drive the head 19a one way or the other depending on the manner of supply of fluid to the motor. During rotation of the head, it is stabilized by the rollers 125, which roll against the rear surface of the head.

The pin 123 and clevis 121 are located radially inwardly of the rollers 125 so that they may pass inwardly of the rollers in the event it is desired to rotate the head a substantial extent.

Figures 13, 14:
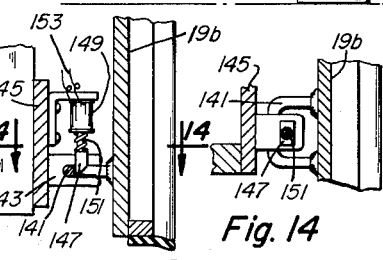
FIG. 13 is a fragmentary vertical sectional view of a modified form of the invention which shows positive stabilizing mechanism.
FIG. 14 is a horizontal sectional view taken along line 14—14 of FIG. 13.

The stabilizing arrangements in FIGS. 1–12 may be considered as semi-positive, since it is the force of gravity that provides stabilization. FIGS. 13 and 14 show that positive stabilization may be obtained by means of a pair of latches, one of which is shown. The uses of latches in connection with a structure like that in FIGS. 1–7 will first be explained.

Instead of two lugs 43, a pair of latches like the latch in FIGS. 13 and 14 will be employed. This latch includes a bail-like element 141 secured in a horizontal position to the rear of the head 19b. This element can fit within a jaw 143 provided by a bifurcated element which is secured to a crosspiece 145 of the carriage base unit 17b. The jaw 143 has a vertical non-circular bore slidably but non-rotatably receiving a latch member 147. The latch member is connected to the armature of a solenoid coil 149 which is mounted on the crosspiece 145. A compression spring 151 urges the latch member 147 to assume a latched position.

To release the head 19b the solenoids 149 are energized through conductors 153, which lead to a switch (not shown) on the truck body. This raises the latch members 147 to permit withdrawal of the bails 141. Thereafter the lower portion of the head 19b is free to move forwardly, after which the head is free to adjust its position to that of the load.

When the load is subsequently picked up, the tilting movement created by the load on the head will cause the bails 141 to move rearwardly into the jaws 143. If the solenoids have been de-energized, the bails will strike the latch members and raise them because of their angular lower faces, and then be latched in place as the compression springs force the latch members downwardly in front of the bails.

On the other hand, if the solenoids 149 are still energized, they may be de-energized after the bails enter the jaws 143 to enable the springs to snap the latch members downwardly.

Figure 15:
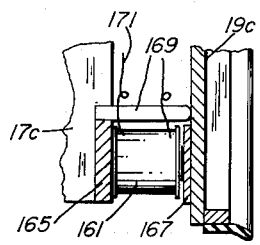
FIG. 15 is a fragmentary vertical sectional view of another modified form of the invention.

FIG. 15 shows a stabilizing arrangement which includes an electromagnet 161 mounted on the crosspiece 165 of the carriage base unit 17c. An iron piece 167, secured to the rear of the head 19c, functions as an armature. A spacing member 169 is secured to the crosspiece 165 and abuts against the rear of the head 19c to prevent actual contact between the piece 167 and the electromagnet. This precludes residual magnetism in the electromagnet from holding the piece 167 against the electromagnet even after the supply of current to the latter is terminated.

So long as the electromagnets are de-energized, the lower portion of the head 19c is free to move away from the electromagnets, after which the head is free to tilt about its universal joint. However, once a load is picked up and the head contacts the spacing members 169, the load may be more positively stabilized by energizing the electromagnets 161 through the conductors 171 to exert an electromagnetic force on the head to hold it against movement relative to the carriage base.

If the latches or electromagnets of FIGS. 13–15 are to be utilized on the second form of the invention, they would be mounted on the opposed portions of the head and apron, since these parts do not rotate relative to one another.

Another form of invention

FIGS. 16–20 show another form of the invention, which is also disclosed in my copending application entitled "Suction Apparatus and Method For Picking Up Articles, Especially Paper Rolls," Serial No. 64,639, filed October 24, 1960.

In order that ready comparison may be made, in regard to common subject matter, between the present application and my prior application, certain portions of my prior application will be duplicated here, with only a few changes. To avoid conflict with reference numerals previously used in the present application, the reference numerals of my prior application will be employed, where possible, but distinguished by the letter "p."

General description

Referring to the drawings and particularly to FIGS. 16–20, the lift truck (not shown) has a mast 23p at the front end. A load carriage of the present invention is mounted by rollers 25p in the mast for movement therealong under the influence of a lift mechanism, such as a hydraulic ram (not shown).

The load carriage includes as primary elements a carriage unit 31p having the rollers 25p, a base member 33p mounted on the carriage for limited pivotal movement by a connection 34p, a revolving apron 35p rotatably mounted on the base member, and a suction head 300 mounted on the apron and having a cylindrically curved face for conforming engagement with a paper roll or other cylindrical object to be picked up.

The suction head 300 is considerably simpler than that shown in my prior application Serial No. 64,639. A simple head is shown in the present application because the present invention concerns a mounting means for a suction head and not the suction head itself. It follows that the showing of a complex head arrangement would be of no aid in, but rather detract from, a ready understanding of the mounting means.

If the roll to be picked up is in a horizontal position, the suction head can be rotated 90 degrees to adapt it for proper engagement with the roll. It is also obvious that a roll picked up in a vertical position can be revolved to the horizontal position for deposit in a horizontal position if desired.

Figure 18:
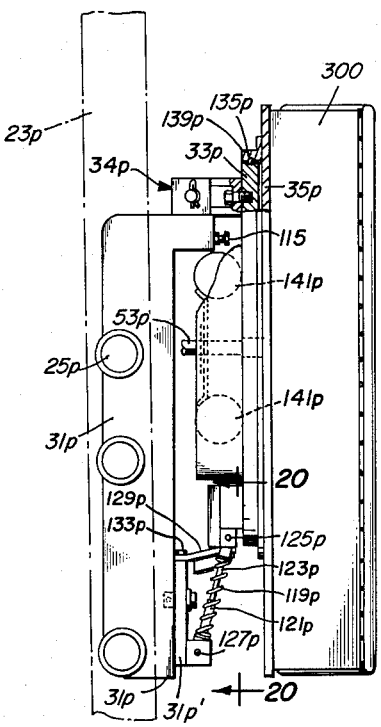
FIG. 18 is a side elevation view of the structure in FIG. 16.

Referring to FIG. 18, the suction head is connected to a source of suction on the truck body, such as a vacuum pump by a hose or conduit 53p. The hose 53p extends from the pump forwardly past a control valve, and then over a slack take-up sheave mounted on the inner movable uprights of the mast, and then extends downwardly and to a rotary connection between the base member 33p and the apron 35p.

In operation, as the head is brought into engagement with a roll, the valve is operated to connect the suction head to the suction pump so that atmospheric pressure forces the roll against the head with sufficient force to enable the carriage to be elevated to lift the roll.

SPECIFIC DESCRIPTION

Base member mounting

Figure 16:
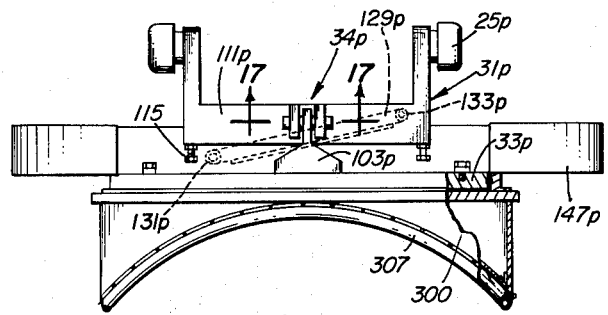
FIG. 16 is a plan view of another form of the invention.
Figure 17:
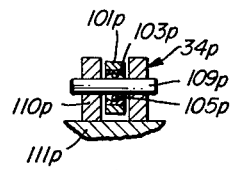
FIG. 17 is a fragmentary vertical section taken along lines 17—17 of FIG. 16.

Referring to FIGS. 16, 17 and 18, the connection 34p is at the upper portion of the base member 33p (FIG. 18) which comprises a flat circular plate (barely visible in FIG. 18).

The connection 34p comprises a universal joint having a socket member 101p (FIG. 17) carried by a lug 103p provided on the rear of the base member 33p (FIG. 16). The socket member has a ball member 105p bored to receive a pin 109p, the ends of the latter fitting in holes in a clevis 110p fixed to the upper end of a crosspiece 111p of the carriage unit 31p. The spaces between the clevis and the lug allow for pivotal movement of the base member relative to the carriage unit about a vertical axis. A pair of laterally spaced stop elements 115p (FIG. 16) below the connection 34p and on opposite sides of the vertical axis adjustably thread into the carriage unit and serve as stops to positively limit such pivotal movement.

Figure 20:
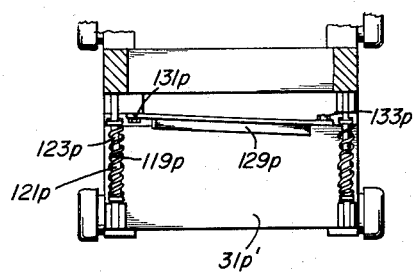
FIG. 20 is a fragmentary front elevational view taken in the direction of the arrows 20—20 of FIG. 18.

The base member can also pivot rearwardly on the connection 34p. Referring to FIGS. 18 and 20, to control such pivotal movement there is provided a pair of spring assemblies each including a compression spring 119p surrounding telescoped elements 121p and 123p pivotally connected at 125p to the base member 33p and at 127p to a cross plate 31p' of carriage unit 31p, respectively. The springs make a small acute angle with the vertical. Hence, the springs are compressed only slightly by substantial rearward movement of the lower portion of the base member. Thus, while rearward movement of the lower portion of the base member is resisted by the springs, it takes only a relatively small increase in force to so move the base member because of the angular relationship of the parts. Thus the springs 119p and their elements 121p provide a dampening effect to help stabilize the base member before a load is picked up. As is apparent from FIGS. 18 and 20, these elements are disposed at a level below that of the joint 34p and are disposed one on either side of a vertical line through the joint.

Referring to FIGS. 16, 18 and 20, at the bottom of the base member 33p there is a link 129p pivotally connected at 131p to the base member and at 133p to the carriage unit. The link is operable to prevent revolving movement of the base member 33p about an axis extending longitudinally of the truck, but at the same time the link permits wobbling movement of the base member about the same axis.

Apron mounting

Figure 19:
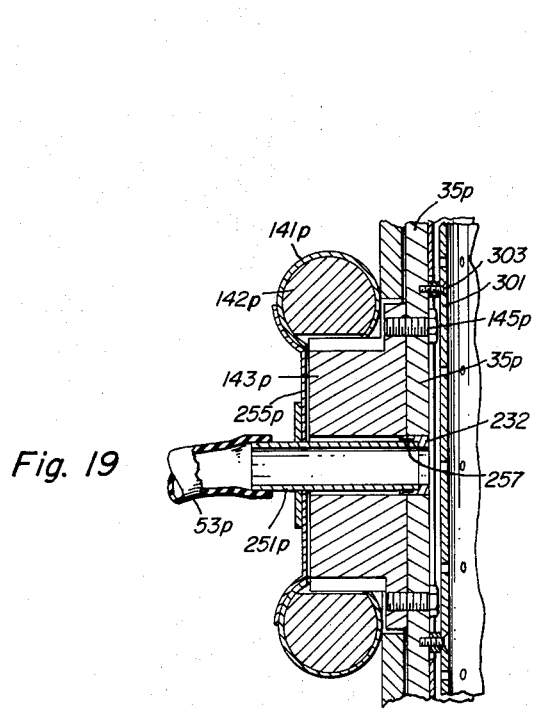
FIG. 19 is an enlarged fragmentary vertical mid-sectional view through the structure of FIG. 18.

The apron 35p essentially comprises a generally flat generally rectangular plate having a revolving connection between the apron and the base member 33p, which connection is shown in FIGS. 16, 18 and 19 and is generally like that shown in the Ehmann Patent 2,959,131. Thus, referring to FIG. 18 of the present application, there is an annular row of bearings 135p between the base member 33p and an annular flange 139p on the apron 35p. Referring now to FIGS. 16, 18 and 19, a pair of cylinders 141p fixed on the base member have pistons 142p equipped with rack teeth to drive a pinion 143p. The pinion is secured by bolts 145p to the apron 35p. Suitable housing members 147p (FIG. 16) are provided for the ends of the cylinders 141p.

The hydraulic conduits or hoses between the truck and the cylinders 141p are not shown, but may be of conventional form. These hoses extend from the truck over suitable slack take-up devices, not shown, and then lead to the carriage unit and connect to suitable fittings (not shown) mounted on the carriage unit 31p. Short hose sections (not shown) extend from the fittings to the cylinders 141p.

The rotary connection for the hose 53p (previously mentioned) includes a tube 251p (FIG. 19) mounted by a support strip 255p on the cylinders 141p. The tube 251p extends through a bore in the pinion gear 143p and has a rotary sliding fit in a sleeve 232. The sleeve is fixedly mounted in the apron 35p and pinion gear 143p. An O-ring 257p provides a seal between the sleeve 232 and tube 251p.

The head 300 has a backing member 301 (FIGS. 16 and 19) mounted by suitable spacers and bolts 303 (two of which are shown in FIG. 19) on the apron 35p. The backing member is perforated to provide air passage holes for distributing the suction, and its face is waffled or rough like the roll engaging plates in my prior application for better suction distribution. The head 300 has an endless elastomer sealing member 307 therearound for contact with the load.

Operation

In picking up a load such as a paper roll or other cylindrical object, the driver will make an attempt to center the head 300 with respect to the load. However, this need only be approximate because the head 300 has universal movement about the connection 34p. Thus it can adjust its position and orientation to that of the load.

After a vacuum is drawn and the load is picked up, the weight of the load will create a moment forcing the head 300 to swing rearwardly to bring the springs 119p against the cross-plate 31p' to stabilize the load against free swinging movement.

An advantage the second form of the invention has over the form of the invention of FIGS. 16–20 is that the universal joint of the second form is located approximately at the center of gravity of the head whereas the joint of the FIGS. 16–20 form is disposed above the center of gravity of its head. This means that a greater force must be imposed by the load on the latter head than the former head in order to reposition and reorient the head to conform to the position and orientation of the load. The springs and the tie bar or link of the FIGS. 16–20 form also increase the force necessary to move the head of such form.

Another advantage is that only the suction head proper is mounted by the universal joint in the second form, whereas all of the rotating mechanism as well as the head proper is mounted by the joint in the FIGS. 16–20 form.

The particular vacuum or suction heads disclosed are, insofar as their shape and detailed construction is concerned, only illustrative, and it is apparent that suction heads of other shapes and forms and construction could be substituted for those shown.

Having described the invention in what is considered to be the preferred embodiment thereof, it is desired that it be understood that the invention is not to be limited other than by the provisions of the following claims.

I claim:

1. In a lift truck having an upright mast mounted for forwardly and rearwardly tilting movement and means for moving said mast from a rearwardly inclined position to a forwardly inclined position,
    a load carriage movable vertically along said mast,
    an upright vacuum face plate including a load-engaging face,
    universal joint means mounting said face plate on said carriage for universal pivoting movement relative to said carriage and with said face facing in a forwardly direction,
    abutment type stop means mounted on said carriage below said universal joint means, said stop means disposed on each of opposite sides of a vertical line through the pivotal connection of said face plate and said carriage,
    said stop means being spaced rearwardly of the plane of said face in all positions of said face plate such that when said mast is forwardly inclined and said face is out of engagement with a load, said face plate is pivotable about its universal connection without interference from said stop means to enable said face plate to adjust its position to that of a load upon engagement with said load, and such that when said face plate elevates a load said face plate is caused to tilt about its horizontal pivotal axis to abut said stop means and thus stabilize said load.

2. In a lift truck having a vertical tiltably mounted mast and means for moving said mast from a rearwardly inclined position to a forwardly inclined position,
    a load carriage movable vertically along said mast,
    a vacuum head carried by said carriage and having an upright face including continuous sealing means for engaging a load to be picked up and having a rigid base structure,
    mounting means for supporting said head with the face thereof facing forwardly, said mounting means including universal joint means mounting said head for universal movement to facilitate pivoting movement thereof about horizontal and vertical axes to enable it to adjust its position to that of the load to be picked up, abutment type stop means mounted on said carriage and disposed rearwardly of said head and below said universal joint means, said stop means being positioned such that when said mast is in its forwardly inclined position and said head is disposed with the face thereof facing directly forwardly, said abutment means will be spaced rearwardly from the rear surface of said vacuum head base means, so as to enable said head to pivot on said joint to properly engage a load without interference by said stop means, and such that when said mast is rearwardly inclined with a load on said face, said head engages said stop means to prevent pivotal movement of said head and thus stabilize said load.

3. A lift truck carriage structure comprising, a base unit, a revolving apron on said base unit, a vacuum head mounted on said apron for nutation about an axis parallel to the axis of rotation of said apron, means for rotating said apron, and roller means on said base unit for engaging said head and stabilizing the same.

4. In a carriage structure, a base unit for movement along the mast of a lift truck, three coaxially related plate members disposed at the front of said base unit, the rear plate member being of circular form and being fixedly connected to said base unit, the intermediate plate member being rotatably mounted on said rear plate member and having a flange portion enclosing the periphery of said rear plate member, power means on said base unit for driving said intermediate plate member through said flange portion, a tubular member extending axially through said plate members and fixedly secured to said intermediate plate member, the front plate member being mounted for wobbling movement on said tubular member to enable said front plate member to conform its position to that of a load engaged thereby, load engaging sealing means on the front of said front plate member, means for connecting the rear end of said tubular member to a source of vacuum, and axially compressible sealing means surrounding said shaft and sealingly engaging said front and intermediate plate members.

5. In a roll pick-up device for a lift truck, a carriage structure to be elevated, a base structure carried by said carriage structure, a rotary structure carried by said base structure, suction means carried by said rotary structure, means pivotally connecting said base structure to said carriage structure locally of the upper end of said carriage structure to permit forward and rearward movement of the lower portions of said base structure, and yieldable means urging said base structure to assume a predetermined position relative to said carriage structure and yieldable to facilitate movement from such position, link means at the lower end of said base structure to prohibit rotary movement of such base structure about a longitudinal axis of the truck, and laterally spaced stop means at about the level of the pivot means for preventing or limiting pivotal movement of said base structure about a vertical axis through said pivot means.

References Cited by the Examiner

UNITED STATES PATENTS

| | | | |
|---|---|---|---|
| 2,468,326 | 4/49 | Gleason. | |
| 2,595,131 | 4/52 | Ehmann | 214—653 |
| 2,784,861 | 3/57 | Nelson | 214—653 |
| 2,853,333 | 9/58 | Littell | 294—64 |
| 2,941,675 | 6/60 | Noble et al. | |
| 2,942,745 | 6/60 | Horton | 214—650 |
| 2,989,201 | 6/61 | Hansen | 214—652 |
| 3,040,920 | 6/62 | Harris | 214—651 |
| 3,063,746 | 11/62 | Oakes | 294—64 |
| 3,089,723 | 5/63 | Fortson et al. | |

HUGO O. SCHULZ, *Primary Examiner.*

MORRIS TEMIN, *Examiner.*